United States Patent [19]

Snider

[11] Patent Number: 5,039,260

[45] Date of Patent: Aug. 13, 1991

[54] DRIVER ELEMENT FOR USE WITH RIVET SHAVERS

[75] Inventor: Phil Snider, Hicksville, Ohio

[73] Assignee: Cooper Industries, Inc., Houston, Tex.

[21] Appl. No.: 390,937

[22] Filed: Aug. 7, 1989

[51] Int. Cl.⁵ .......................................... B23B 47/04
[52] U.S. Cl. ................................. 408/124; 408/141; 408/112
[58] Field of Search ............... 408/239 R, 239 A, 141, 408/81, 82, 124, 125, 204, 207, 112, 84; 279/1 A, 7, 99-101; 407/144, 230; 411/410, 402, 403, 405, 427, 911; 285/390-393; 403/343

[56] References Cited

U.S. PATENT DOCUMENTS

| | | | |
|---|---|---|---|
| 851,137 | 4/1907 | Manley | 279/7 |
| 3,380,746 | 4/1968 | Benjamin et al. | 279/91 |
| 3,415,154 | 12/1968 | Skierski | 411/403 |
| 3,843,143 | 10/1974 | Laxson | 279/1 A |

FOREIGN PATENT DOCUMENTS

| | | | |
|---|---|---|---|
| 2937980 | 6/1981 | Fed. Rep. of Germany | 411/427 |
| 1427828 | 12/1964 | France | 411/402 |
| 527340 | 10/1940 | United Kingdom . | |
| 671087 | 4/1952 | United Kingdom | 411/403 |

Primary Examiner—Larry I. Schwartz
Assistant Examiner—Robert Schultz
Attorney, Agent, or Firm—Eddie E. Scott; William B. Patterson

[57] ABSTRACT

The rivet shaver driver element of the present invention includes an internally threaded hollow cylindrical body. At one end of the hollow cylindrical body is located a drive slot. Along the length of the driver element are spindle locking slots. Wrench flats are formed on the sides of the drive element. The placement of the drive slot spindle locking slots and wrench flats as such that the driver element is dynamically symmetrical.

1 Claim, 2 Drawing Sheets

DRIVER ELEMENT FOR USE WITH RIVET SHAVERS

BACKGROUND OF THE INVENTION

The present invention relates to rivet shavers; more particularly, the present invention relates to driver elements for use with rivet shavers.

A rivet shaver is a rotating tool used to shave off the tops of rivet heads particularly when the rivets are used to attach the skin to the frame of an aircraft wing.

To achieve high production rates a high speed motor such as an air motor is used with a shaving tool. The shaving tool is then placed over the rivet and the head of the rivet is shaved off. Because of the high speed of the tool there is a need to reduce the amount of tool vibration. Should tool vibration exist the vibrations must be absorbed by the operator, thus increasing operator fatigue or increasing the chance for a poor job in shaving off the head of the rivet. There is therefore a need to assure that all components within the rivet shaving tool are dynamically symmetrical. Such dynamic symmetry will reduce the vibration of the tool.

SUMMARY OF THE INVENTION

A driver element for a rivet shaving tool is formed from a hollow cylindrical body. Within the hollow cylindrical body are internal threads which mount the driver element to the drive shaft emanating from the motor which drives the rivet shaving tool. A drive slot is formed along a diameter of the hollow cylindrical body for driving the rivet shaver. Located along the body of the driver element are a pair of spindle locking slots. In the preferred embodiment the spindle locking slots are placed orthogonal of the drive slot. Wrench flats are formed on opposite sides of the drive slot to facilitate removal of the driver element from the drive shaft of the motor. The formation of the various parts of the driver element is such that it is dynamically symmetrical about its long axis.

BRIEF DESCRIPTION OF THE FIGURES

A better understanding of the driver element for a rivet shaver may be had by reference to the drawings wherein.

DESCRIPTION OF THE EMBODIMENTS

Figure 1:
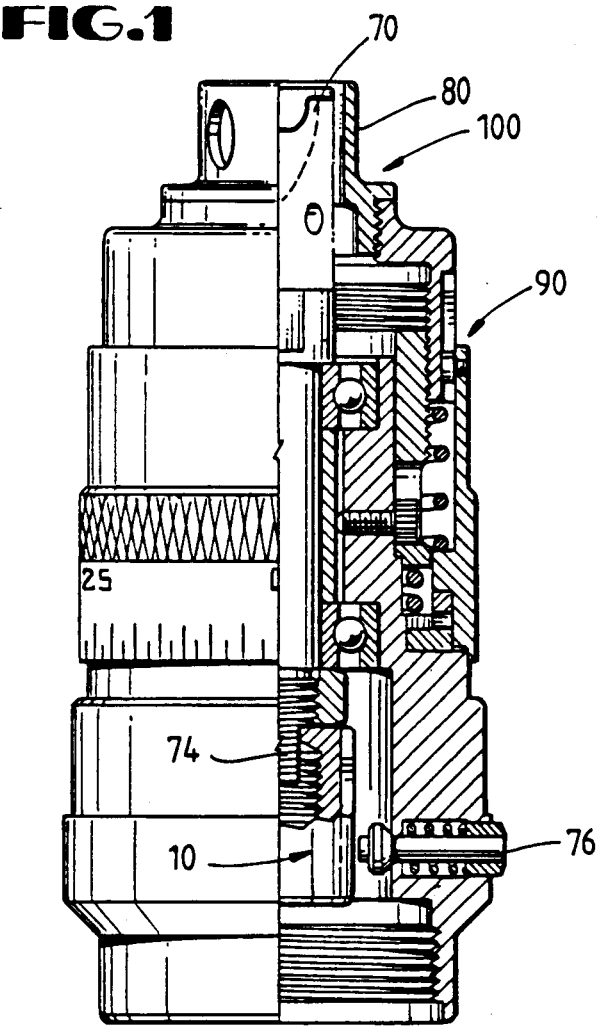
FIG. 1 is a side elevational view in partial section of a rivet shaver.

In FIG. 1 it may be seen that the driver element 10 of the present invention is used with a rivet shaving tool 100. Driver element 10 transmits rotational force from the drive motor (not shown) to the cutter 70. Located between the driver element 10 and the cutter 70 is an adjustment mechanism 90 which allows for setting the position of the cutter 70 with respect to skirt 80 to assure that rivets heads are properly shaved.

Driver element 10 transmits rotational force and is often require to operate at high speeds. Prior art designs for driver elements neglected the criticality of the driver element. This neglect produced disruptive vibrations when the rivet shaver 100 was used for its desired function. Such disruptive vibrations were either absorbed by the operator, thus increasing operator fatigue, or resulted in a poorly shaved rivet head.

Figure 2:
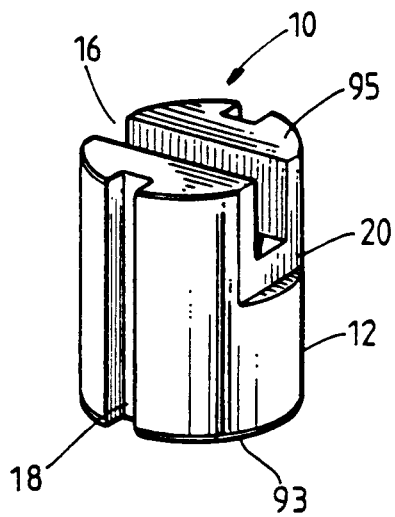
FIG. 2 is a perspective view of the preferred embodiment of a driver element for use with a rivet shaver.
Figure 3:
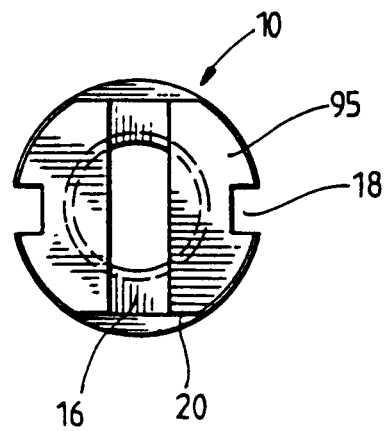
FIG. 3 is a top view of the driver element shown in FIG. 2.
Figure 4:
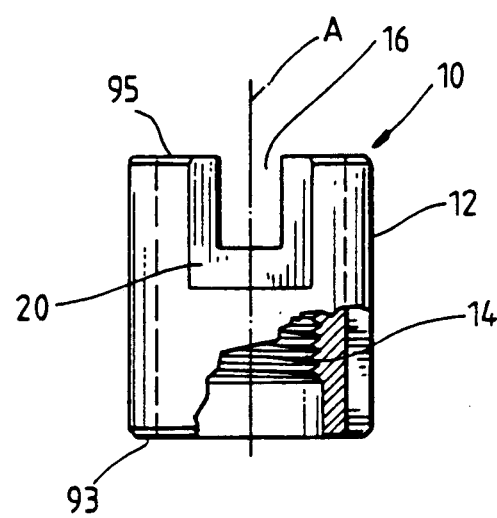
FIG. 4 is a side view of the driver element shown in FIG. 2.
Figure 5:
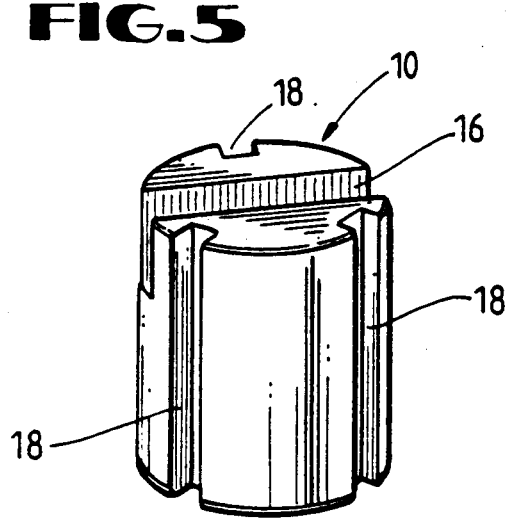
FIG. 5 is a first alternate embodiment of the driver element of the present invention.

In FIGS. 2, 3 and 4, the actual construction of the preferred embodiment of the dynamically symmetrical driver element 10 of the present invention may be best understood. Therein it may be seen that driver element 10 consists of a cylindrical body 12 with distal 95 and proximal 93 ends. Within body 12 are located internal threads 14 which are used for connection to a shaft (not shown) emanating from the drive motor. While internal threads 14 are shown in the preferred embodiment it will be understood that other means of connection such as longitudinal splines may be used without departing from the scope of the invention.

Figure 6:
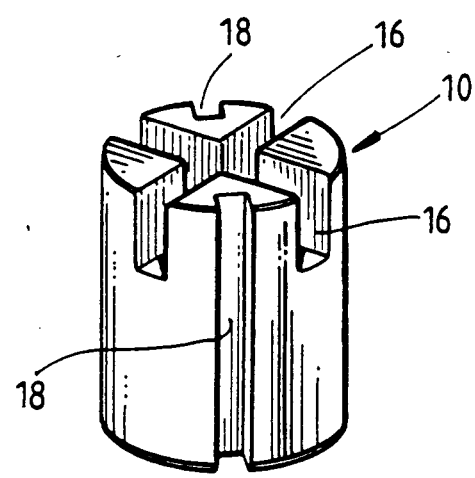
FIG. 6 is a second alternate embodiment of the driver element of the present invention.

Located on distal end 95 of driver element 10 is drive slot 16. Drive slot 16 is formed along a diameter of hollow cylindrical body 12. Drive slot 16 is formed to mate with drive tang 74 on rivet shaver 100. While one drive slot 16 is shown in the preferred embodiment it will be understood that an additional drive slot ma be formed orthogonally to drive slot 16 without a reduction in dynamic symmetry and thus will not depart from the scope of the invention. Such construction is shown in FIG. 6.

When the need arises to change cutting tool 70 it is necessary to lock the entire rotating mechanism of the rivet shaver 100. When such change is necessary tang 76 (FIG. 1) mechanically engages one of the spindle locking slots 18. It will be noted that a spindle locking slot 18 is located along either side of the driver element 10. While longitudinal spindle locking slots 18 are shown it will be understood that a variety of different shapes may be used without departing from the scope of the invention. Those of ordinary skill in the design of rivet shavers and small air tools will appreciate the number o alternate shapes available such as holes, keyways, etc.

A variety of different placements may be used for spindle lock slots 18 as long as such placement provides for dynamic symmetry. A minimum of two slots is required to achieve dynamic stability; however additional slots may be used provided as long as a stable dynamic moment around the long axis of the driver element is obtained. In FIG. 3 driver element 10 is shown with three slots 18.

Figure 7:
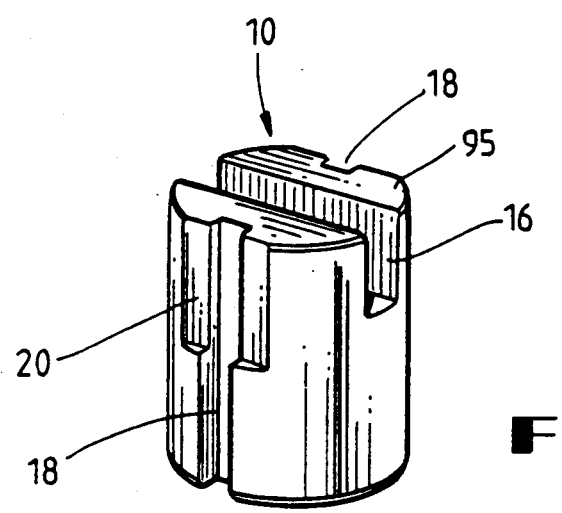
FIG. 7 is a third alternate embodiment of the driver element of the present invention.

An additional key feature of the driver element 10 of the present invention is the addition of wrench flats 20 at either end of drive slot 16. Such wrench flats 20 provide for easy attachment and removal of the driver element 10 from the drive motor. While wrench flats 20 are shown at either end of the drive slot 16 it will be understood that wrench flats 20 may be placed at the top of the spindle locking slots 18 on the distal end 95 of the driver element 10. Such construction is shown in FIG. 7. Should it be desired to not locate wrench flats 20 at the distal end 95 of the driver element 10 it will be understood that wrench flats 20 may be located at any point along the driver element 10 without departing from the scope of the invention. The only requirement on placement of wrench flats 20 is the need to provide dynamic symmetry.

In operation the feature of the driver element 10 which produces essentially vibration free tool operation is the dynamic symmetry of the driver element 10 about its long axis "A" (FIG. 4). Because each part of the driver element has dynamically opposite counterpart there is no vibration when the driver element 10 is rotated.

Still other embodiments of driver element 10 will become apparent to those of ordinary skill in the art once having read the foregoing description and accompanying claims.

I claim:

1. In a rivet shaving tool, a driver element comprising:
   a hollow cylindrical body having a distal end and a proximal end;
   a plurality of internal threads formed within said hollow cylindrical body;
   a plurality of drive slots formed along a diameter of said hollow cylindrical body on said distal end;
   a pair of spindle locking slots formed along the length of said hollow cylindrical body orthogonally of said drive slot;
   a pair of wrench flats formed orthogonally of said drive slot;
   whereby the driver element is dynamically symmetrical about the long axis of said hollow cylindrical body.

* * * * *